United States Patent [19]

Kato

[11] Patent Number: 4,510,540
[45] Date of Patent: Apr. 9, 1985

[54] CASSETTE EJECTION MECHANISM FOR A CASSETTE TAPE RECORDER

[75] Inventor: Toshikazu Kato, Tokyo, Japan

[73] Assignee: Olympus Optical Co., Ltd., Tokyo, Japan

[21] Appl. No.: 393,784

[22] Filed: Jun. 30, 1982

[30] Foreign Application Priority Data

Jul. 13, 1981 [JP] Japan .................... 56-103520[U]

[51] Int. Cl.$^3$ .............................................. G11B 15/00
[52] U.S. Cl. ...................................... 360/93; 360/96.5
[58] Field of Search ............... 360/93, 90, 96.5, 96.6, 360/96.1; 242/198–199

[56] References Cited

U.S. PATENT DOCUMENTS

| | | | |
|---|---|---|---|
| 3,638,953 | 2/1972 | Kodama et al. | 360/96.6 |
| 4,301,484 | 11/1981 | Sawaguchi et al. | 360/96.6 |
| 4,335,409 | 6/1982 | Yokota et al. | 360/96.6 |
| 4,377,829 | 3/1983 | Kamimura et al. | 360/93 X |

Primary Examiner—John H. Wolff
Attorney, Agent, or Firm—Frishauf, Holtz, Goodman and Woodward

[57] ABSTRACT

A cassette ejection mechanism comprises an ejecting plate attached movably to a guide plate, a coupling plate rockably attached to the guide plate, the coupling plate having a pin and rocking in response to the slide motion of a sliding member, a toggle spring stretched between the guide plate and the coupling plate to apply an urging force to the coupling plate in rocking motion, and a swinging strip swingably attached to the ejecting plate, the swinging strip having a holding cam to engage the pin of the coupling plate to cause the coupling plate to rock against the urging force of the toggle spring as the ejecting plate moves from a second position to a first position and to be disengaged from the pin after the toggle spring passes its neutral point.

5 Claims, 12 Drawing Figures

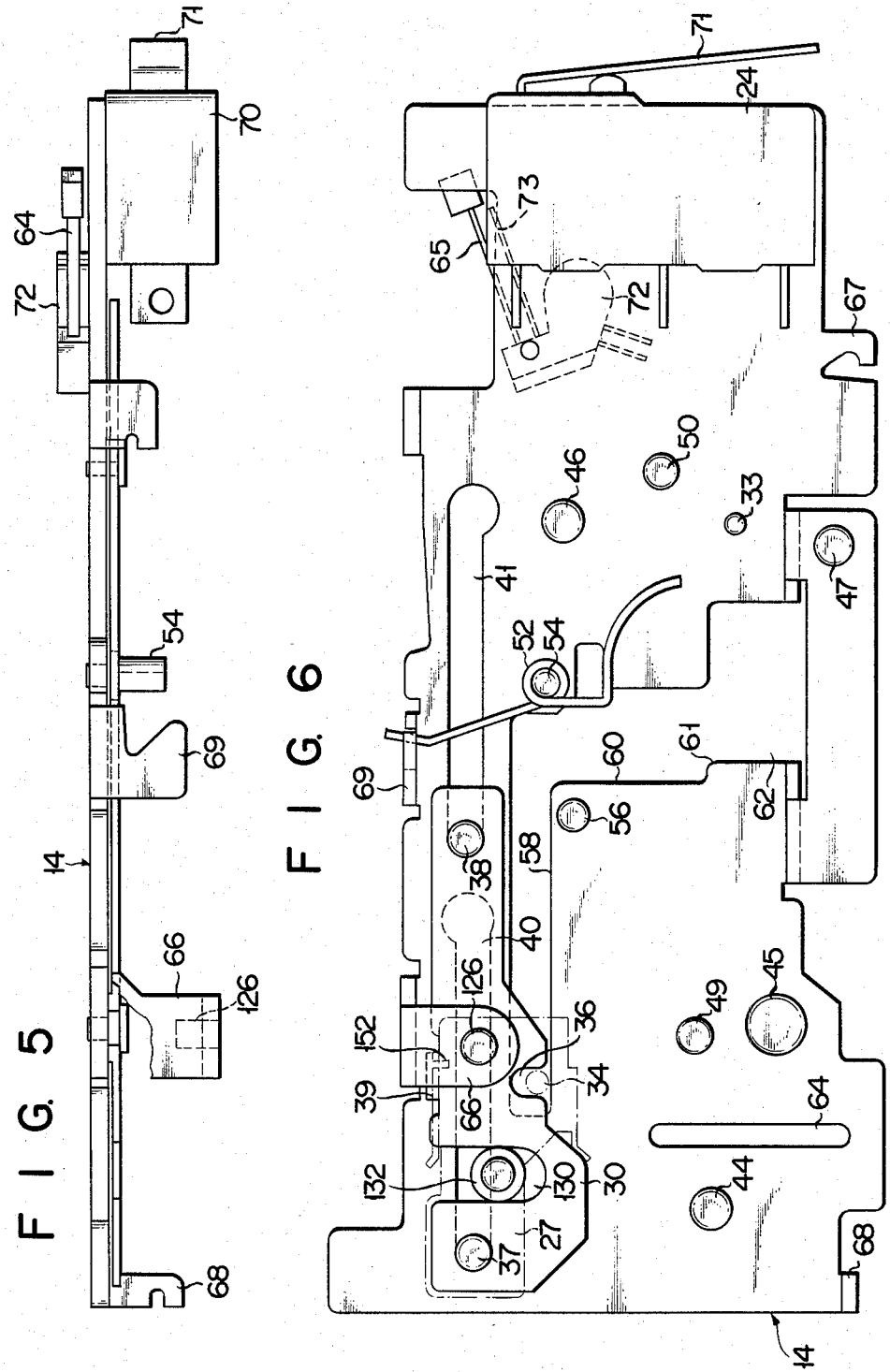

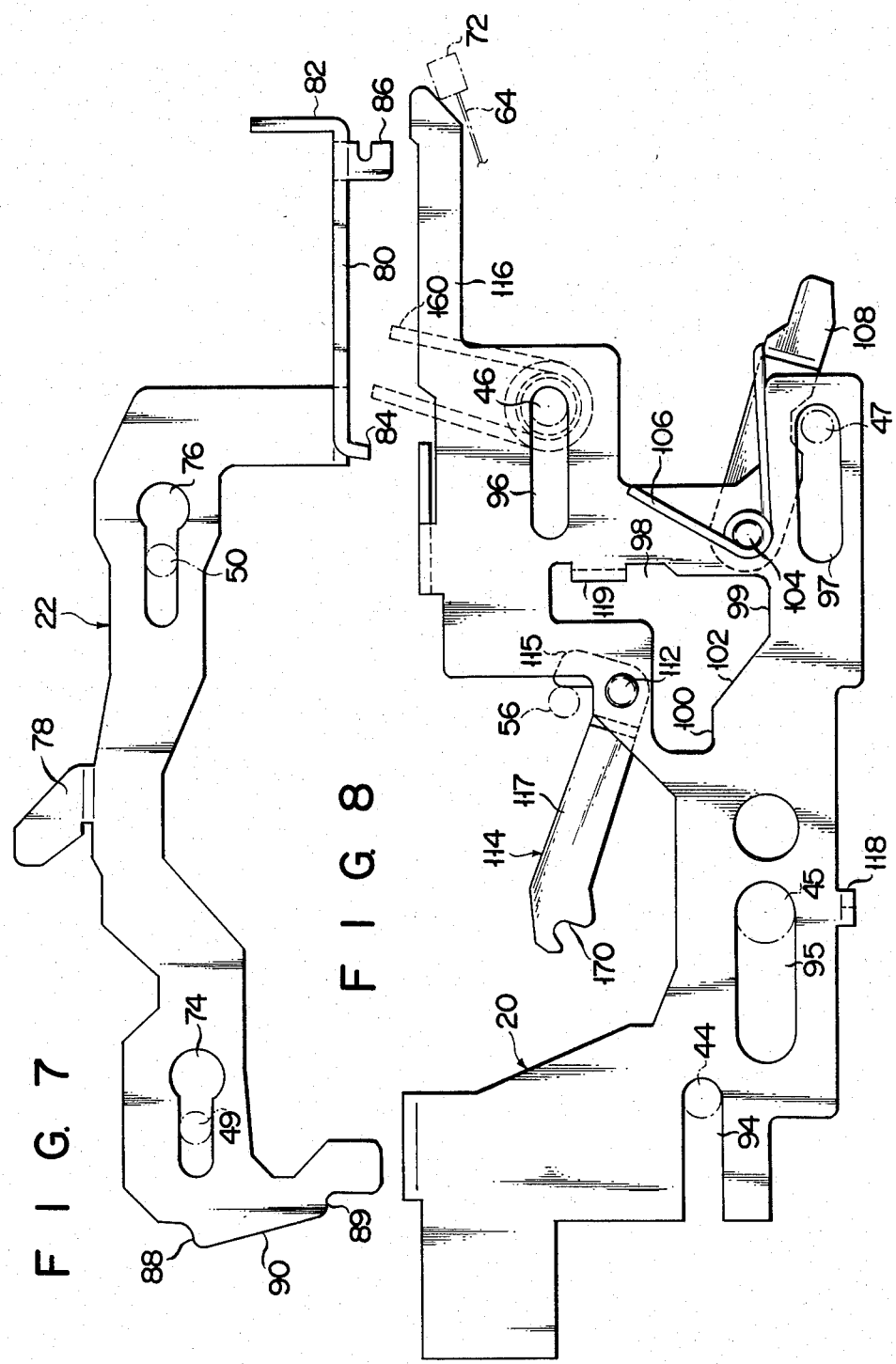

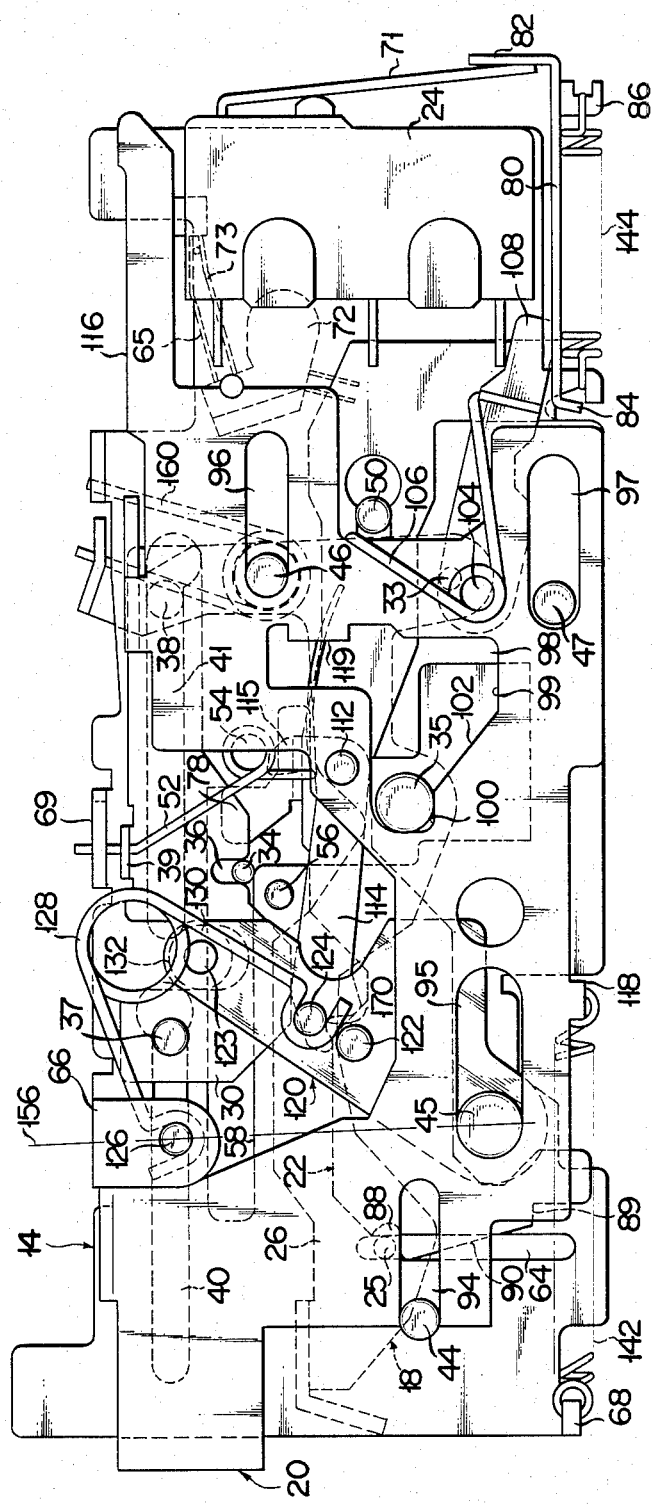

CASSETTE EJECTION MECHANISM FOR A CASSETTE TAPE RECORDER

BACKGROUND OF THE INVENTION

This invention relates to a cassette tape recorder, more specifically to a cassette ejection mechanism of a cassette tape recorder capable of loading and ejecting a tape cassette by using a toggle spring.

Generally known are cassette tape recorders of the so-called slot-in type in which a tape cassette inserted in a cassette holder slides substantially horizontally in the cassette holder, and then descends together with the holder to reach a position for playback operation. In one such slot-in cassette tape recorder using a toggle spring, the tape cassette inserted in the cassette holder is pushed substantially horizontally in the cassette holder against the urging force of the toggle spring until the toggle spring reaches its neutral point. When the toggle spring passes the neutral point, the urging force of the toggle spring acts so as to cause the cassette to be sucked into the cassette holder. Thus, the cassette pushed into the cassette holder is sucked instantaneously into the cassette holder. The slide stroke of the cassette before the toggle spring reaches its neutral point is called a push-in stroke. The slide stroke of the cassette after the passage of the neutral point of the toggle spring is called a suction stroke. The length of each stroke is proportional to the urging force of the toggle spring. If the suction stroke is made long, then the urging force of the toggle spring to act on the cassette at cassette loading will be great. Thus, the cassette may securely be sucked into the cassette holder. If the suction stroke is made long, moreover, the urging force of the toggle spring to act as an ejecting force on the cassette at cassette ejection will also be great. Thus, the cassette may securely be ejected. If the suction stroke is too long, however, the ejecting force to act on the cassette at cassette ejection will be so great that the cassette will rush out of the cassette holder. If the suction stroke is too short, on the other hand, the ejecting force to act on the cassette will be too small for the cassette to be ejected from the cassette holder without stopping halfway. In the cassette tape recorders of this type, therefore, it would be hard to adjust the suction stroke, that is, the toggle spring.

SUMMARY OF THE INVENTION

This invention is contrived in consideration of these circumstances, and is intended to provide a cassette ejection mechanism of a cassette tape recorder having its suction stroke long enough to ensure satisfactory cassette ejection, and yet so designed that a cassette will not rush out of the cassette holder.

According to one aspect of the invention, a cassette ejection mechanism comprises an ejecting plate attached to a guide plate to be movable between a first position and a second position, whereby a cassette holder is pushed up from a down position to an up position thereof as the ejecting plate moves from the first position to the second position, and a tape cassette in the cassette holder is slidden to be ejected as the ejecting plate moves from the second position to the first position, a coupling plate rockably attached to the guide plate, coupled with slide means, having an engaging portion and rocking in response to the slide motion of the slide means, a toggle spring disposed between the guide plate and the coupling plate to apply an urging force to the coupling plate in rocking motion, and a swinging strip swingably attached to the ejecting plate, the swinging strip having a holding portion to engage the engaging portion of the coupling plate to cause the coupling plate to rock against the urging force of the toggle spring as the ejecting plate moves from the second position to the first position and to be disengaged from the engaging portion after the toggle spring passes its neutral point. According to this cassette ejection mechanism, the ejecting plate is provided with a swinging strip attached thereto, which has a holding portion to engage the engaging portion of the coupling plate to cause the coupling plate to rock against the urging force of the toggle spring as the ejecting plate moves from the second position to the first position and to be disengaged from the engaging portion after the toggle spring passes its neutral point. Even after the toggle spring passes its neutral point, therefore, the urging force of the toggle spring will act on the coupling plate only after the engaging portion of the coupling plate is disengaged from the holding portion of the swinging strip, without doing so immediately. Thus, the coupling plate will never drastically be rocked by the urging force of the toggle spring. Accordingly, even though the suction stroke is long, the cassette will be prevented from rushing out of the cassette holder at cassette ejection. Moreover, the urging force of the toggle spring can readily be adjusted by regulating the time for disengaging the engaging portion of the coupling plate from the holding portion of the swinging strip.

BRIEF DESCRIPTION OF THE DRAWINGS

FIGS. 4 to 9 show several components or members of the cassette tape recorder, in which FIG. 4 is a side view of a cassette holder, FIGS. 5 and 6 are plan and side views, respectively, of a guide plate, FIG. 7 is a side view of a lock plate, FIG. 8 is a side view of an ejecting plate, and FIG. 9 is a side view showing a coupling plate and a toggle spring; and FIGS. 10 to 12 are side views of the cassette tape recorder illustrating several operation modes thereof.

DETAILED DESCRIPTION OF THE PREFERRED EMBODIMENT

Now an embodiment of this invention will be described with reference to the accompanying drawings.

Figure 1:
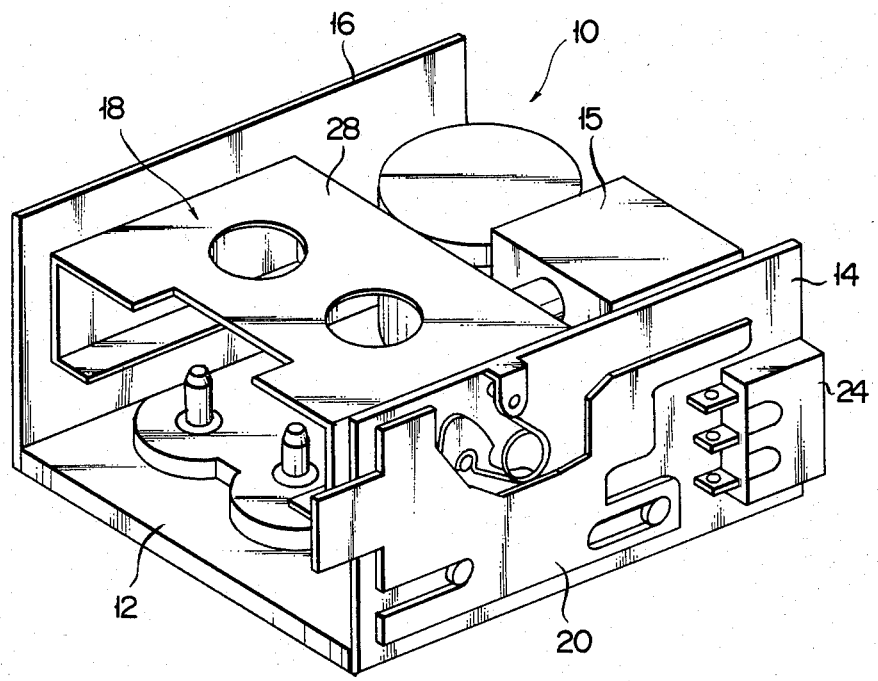
FIG. 1 is a perspective view schematically showing a cassette tape recorder which is provided with a cassette ejection mechanism according to one embodiment of this invention.
Figure 2:
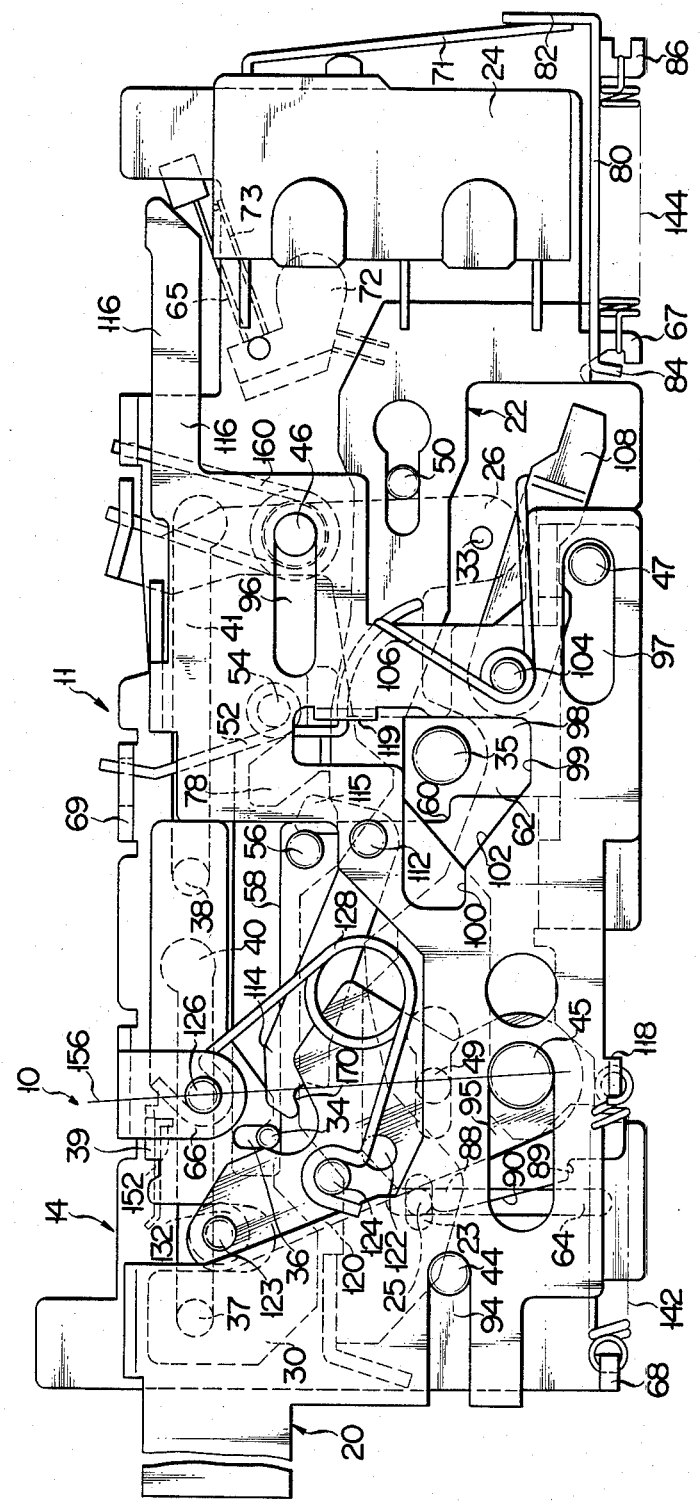
FIGS. 2 and 3 are side views of the cassette tape recorder.
Figure 3:
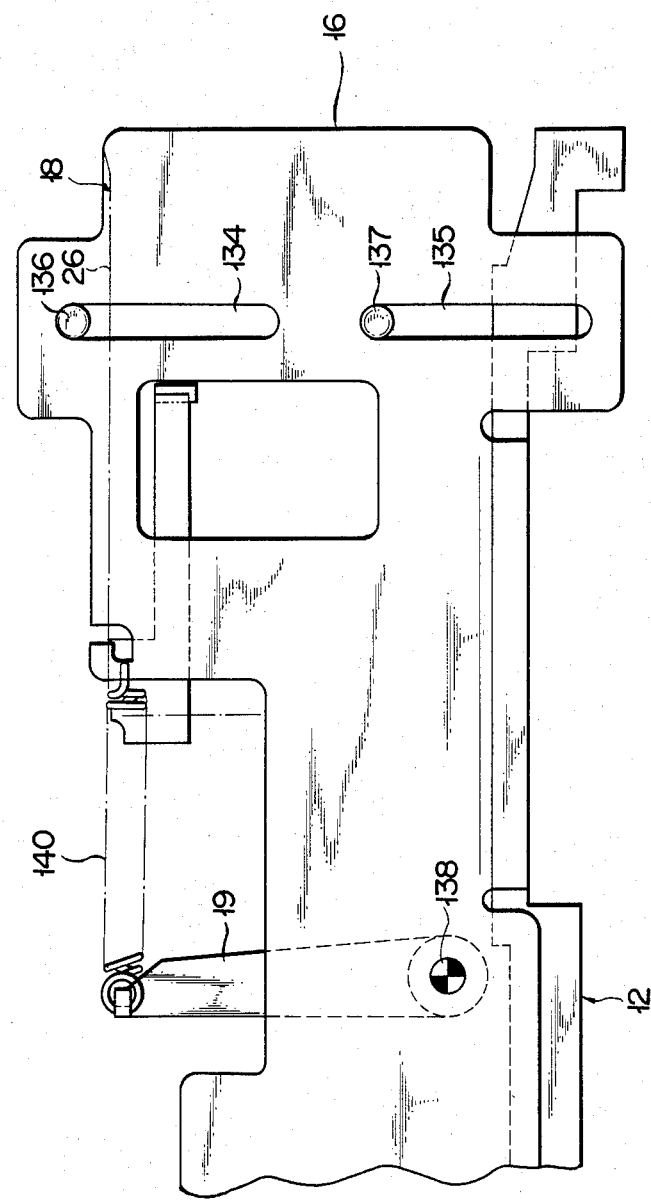

First, an outline of the embodiment will be given. As shown in FIGS. 1 to 3, a cassette tape recorder 11 with a cassette ejection mechanism 10 comprises a base 12 and a pair of guide plates 14 and 16 attached severally to both sides of the base 12, facing each other. The base 12 and the guide plates 14 and 16 constitute a chassis of the cassette tape recorder 11. Above the base 12, a cassette holder 18 is disposed between the guide plates 14 and 16. The cassette holder 18 is supported by the guide plates 14 and 16 so as to be movable between up and down positions. As seen from FIG. 2, the cassette ejection mechanism 10 includes an ejecting plate 20 having a swinging strip 114, and a coupling plate 120. Outwardly separated from the guide plate 14 and a lock plate 22, the ejecting plate 20 is slidably attached to the guide plate 14. The coupling plate 120 is rockably attached to the guide plate 14 between the guide plate 14 and the ejecting plate 20. The coupling plate 120 is subjected to a urging force from a toggle spring 128. A main switch 24 for the cassette tape recorder 11 and a microswitch 72 for a solenoid mechanism 15 to operate a head lever and a pinch roller lever (not shown) are attached to the outer and inner surfaces of the rear end of the guide plate 14, respectively. Locked by the lock plate 22, the cassette holder 18 is normally located in the up position. If a cassette (not shown) is inserted and fully pushed into the cassette holder 18, then the cassette holder 18 will automatically descend, guided by the guide plates 14 and 16. Thus, the cassette holder 18 is locked to the down position by the lock plate 22. As the cassette holder 18 descends in this manner, the lock plate 22 slides from side to side, and the main switch 24 is turned on by the slide of the lock plate 22. The moment the cassette holder 18 is locked to the down position, the pinch roller lever and the head lever on the base 12 move severally to bring a pinch roller and a head (not shown) into contact with a tape, thus starting playback operation automatically. If the ejecting plate 20 is fully pushed in, the cassette holder 18 in the down position is locked to the up position by the lock plate 22 to eject the cassette. At this time, the slide of the ejecting plate 20 causes the microswitch 72 to be shifted to move the pinch roller lever and the head lever so that the pinch roller and the head are separated from the tape. As the ejecting plate 20 slides, moreover, the lock plate 22 slides horizontally or longitudinally to cause the main switch 24 to be turned off.

Figure 4:
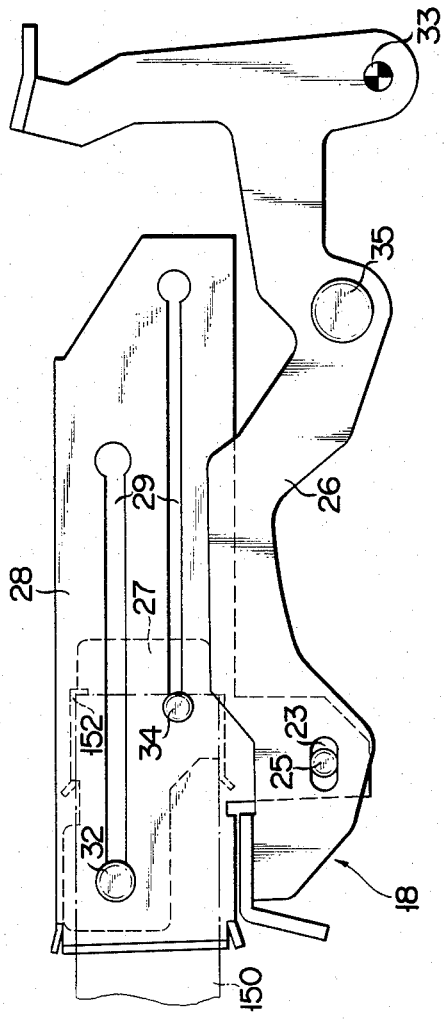

Now the individual components of the cassette tape recorder will be described in detail. As shown in FIG. 4, the cassette holder 18 includes a holder support 26 rockably attached to the guide plate 14, and a holder body 28 swingably supported on the holder support 26 and having a slider 27 therein. The holder body 28 has a guide pin 25, which is loosely fitted in a guide slot 23 in the holder support 26 and projects outward through the guide slot 23. A guide roller 35 is rotatably attached to the holder support 26. The holder body 28 moves up and down as the holder support 26 rocks. The slider 27 has guide pins 32 and 34, which are fitted severally in a pair of horizontally extending guide slots 29 in the holder body 28. Thus, the slider 27 is allowed to slide horizontally along the guide slots 29 inside the holder body 28. The guide pin 34 extends outward from the holder body 28 through one of the guide slots 29. As shown in FIG. 6, the guide pin 34 projects into a guide slot 36 in a control strip 30 slidably attached to the guide plate 14. The slider 27 and the control strip 30 constitute a slide means in this invention. The holder support 26 is rockably attached to the guide plate 14 by means of a rocking pin 33, and the guide pin 25 on the holder body 28 projects into a vertically extending guide slot 64 in the guide plate 14. Further, the cassette holder 18 includes another holder support (not shown) forming a substantially symmetrical configuration with the holder support 26.

As shown in FIGS. 5 and 6, the guide plate 14 has the aforesaid control strip 30, which is attached to the guide plate 14 so as to be able to slide horizontally or longitudinally with its inwardly projecting pins 37 and 38 fitted in horizontally extending guide slots 40 and 41 in the guide plate 14. The guide slot 36 to engage the guide pin 34 of the slider 27 is formed in the lower edge of the control strip 30. A bent strip 39 extends horizontally from the upper edge of the control strip 30. Further, the control strip 30 is provided with a guide slot 130 to engage a coupling plate 120 as mentioned later. The guide plate 14 has a substantially L-shaped guide slot 62, which includes a horizontally extending slide guide surface 58 to support the guide pin 34 of the slider 27 and a vertically extending up-and-down guide surface 60, these guide surfaces extending continuously. The guide plate 14 is further provided with four guide pins 44, 45, 46 and 47 for supporting the ejecting plate 20, two guide pins 49 and 50 for supporting the lock plate 22, a pin 54 wound with a torsion spring 52, and a kick pin 56 to kick the swinging strip 114 of the ejecting plate 20, all these pins projecting outward. A bent strip 66 extends downward from the upper edge of the guide plate 14, and spring peg strips 67 and 68 extend downward and horizontally, respectively, from the lower edge of the guide plate 14. Also, a bent strip 69 extends horizontally from the upper edge of the guide plate 14. At the rear end portion of the guide plate 14, moreover, the main switch 24 and the microswitch 72 for the solenoid mechanism 15 (see FIG. 1) to operate the head lever and the pinch roller lever are attached to the outer and inner surfaces of the guide plate 14, respectively.

As shown in FIG. 7, the lock plate 22 has a pair of horizontally extending guide slots 74 and 76 through which are passed the guide pins 49 and 50 on the guide plate 14, respectively. Further, the lock plate 22 is provided with a bent strip 78 extending inward and upward from its upper end, and a bent strip 80 extending substantially horizontally backward from its rear end. The bent strip 80 has an upwardly extending bent portion 82 capable of engaging the free end of an operating member 71 (see FIG. 6), a downwardly extending bent portion 84 capable of engaging a swinging strip 108 (mentioned later) of the ejecting plate 20, and a downwardly extending spring peg strip 86. The lock plate 22 has first and second holding cams 88 and 89 at its front end edge capable of engaging the guide pin 25 of the holder body 28. The second holding cam 89 is off to the lower right of the first holding cam 88. The vertical and horizontal distances between the holding cams 88 and 89 are utilized for regulating the up-and-down motion of the cassette holder 18 and for shifting the main switch 24. Formed between the holding cams 88 and 89 is a guide surface 90 for guiding the guide pin 25 in motion. When the guide pin 25 engages the first holding cam 88, the cassette holder 18 is locked to its up position. When the guide pin 25 engages the second holding cam 89, on the other hand, the cassette holder 18 is locked to its down position.

As mentioned before, the cassette ejection mechanism 10 is provided with the ejecting plate 20 and the coupling plate 120. As shown in FIG. 8, the ejecting plate 20 has four horizontally extending guide slots 94, 95, 96 and 97 supported by the guide pins 44, 45, 46 and 47 on the guide plate 14, respectively. Further, the ejecting plate 20 has a guide hole 98 in which the guide roller 35 of the holder support 26 is to be inserted. The guide hole 98 has a pair of horizontal guide surfaces 99 and 100 and a slant guide surface 102. The ejecting plate 20 is provided with a pin 104 projecting on both sides thereof. The pin 104 is wound with a torsion spring 106 on the outer surface side of the ejecting plate 20, and is rockably fitted with the swinging strip 108 on the inner surface side of the ejecting plate 20. The swinging strip 108 is urged to swing clockwise by the torsion spring 106. The swinging strip 108 has an outwardly bent tip end portion which is so located as to be able to engage the bent portion 84 (see FIG. 7) of the lock plate 22. The ejecting plate 20 has an inwardly protruding pin 112 whereby the swinging strip 114 is supported swingably. The swinging strip 114 includes a substantially horizontally extending front end portion 117 and an upwardly extending rear end portion 115. A holding cam 170 is formed at the extended end of the front end portion 117. The holding cam 170 constitutes a holding portion in this invention. Further, the ejecting plate 20 has a shift lever 116 for shifting the microswitch 72. The shift lever 116 extends horizontally backward from the upper edge of the ejecting plate 20. Also, the ejecting plate 20 has a spring peg strip 118 on its lower edge, and a spring peg strip 119 on the side edge of the guide slot 98 to engage the torsion spring 52 (see FIG. 6).

Figure 9:
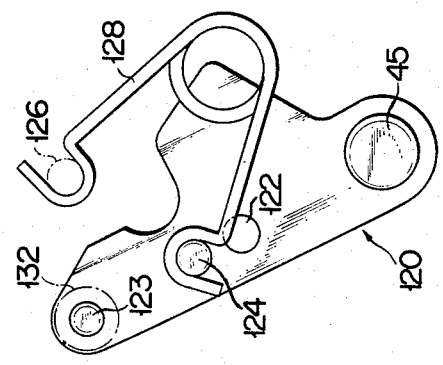

As shown in FIG. 9, the coupling plate 120 is provided with inwardly protruding pins 122 and 123 and an outwardly protruding pin 124. The coupling plate 120 is located between the guide plate 14 and the ejecting plate 20, and is rockably attached to the guide plate 14 by means of the guide pin 45. The toggle spring 128 is stretched between a pin 126 (see FIG. 5) protruding inward from the bent strip 66 of the guide plate 14 and the pin 124. The toggle pin 128 urges the coupling plate 120 to rock around the guide pin 45. The pin 123 is fitted with a guide roller 132, which is fitted in the guide slot 130 (see FIG. 6) in the control strip 30. Thus, the coupling plate 120 is coupled with the control strip 30, and enabled to move integrally with the control strip 30. The pin 122 is so disposed as to be able to engage the holding cam 170 of the swinging strip 114 (see FIG. 8) attached to the ejecting plate 20. The pin 122 constitutes an engaging portion in this invention.

As shown in FIG. 2, the guide plate 16 has vertically extending guide slots 134 and 135 in which are inserted guide pins 136 and 137, respectively, protruding from the holder body 28. A part 19 of the holder support is rockably attached to the guide plate 16 by means of a rocking pin 138. A tension spring 140 is stretched between the holder support and the guide plate 16. The holder support is urged to rock clockwise around the rocking pin 138. The rocking pin 138 is located opposite to the rocking pin 33 (see FIG. 4).

There will now be given a definite illustration of the operation of the cassette tape recorder 11 with the cassette ejection mechanism 10.

FIG. 2 is a right side view of the cassette tape recorder 11 in the state before cassette insertion. In the state, the ejecting plate 20 is urged outward or to the left of FIG. 2 by a tension spring 142 stretched between the spring peg strips 68 and 118. The lock plate 22 is urged to the left by a tension spring 144 stretched between the spring peg strips 67 and 86. The guide pin 34 of the slider 27 is supported on the slide guide surface 58 of the guide slot 62, and the guide pin 25 is caught and locked by the first holding cam 88 of the lock plate 22. Thus, the cassette holder 18 is maintained in its up position. The coupling plate is urged by the toggle spring 128 to rock counterclockwise around the guide pin 45. The urging force of the toggle spring 128 is transmitted through the pin 123 and the guide roller 132 to the control strip 30. Accordingly, the control strip 30 is moved to the left until the pins 37 and 38 run against the left ends of the guide slots 40 and 41, respectively, and the guide pin 34 of the slider 27 engaging the guide slot 36 of the control strip 30 is also moved until it runs against the left end of its corresponding guide slot 29, accompanied with the slider 27. The rear end portion 115 of the swinging strip 114 is restrained by the kick pin 56 of the guide plate 14 from swinging counterclockwise. Before cassette insertion, the main switch 24 and the microswitch 72 are both off. Only part of the cassette holder 18 is shown in FIG. 2 for simplicity of illustration.

Figure 10:
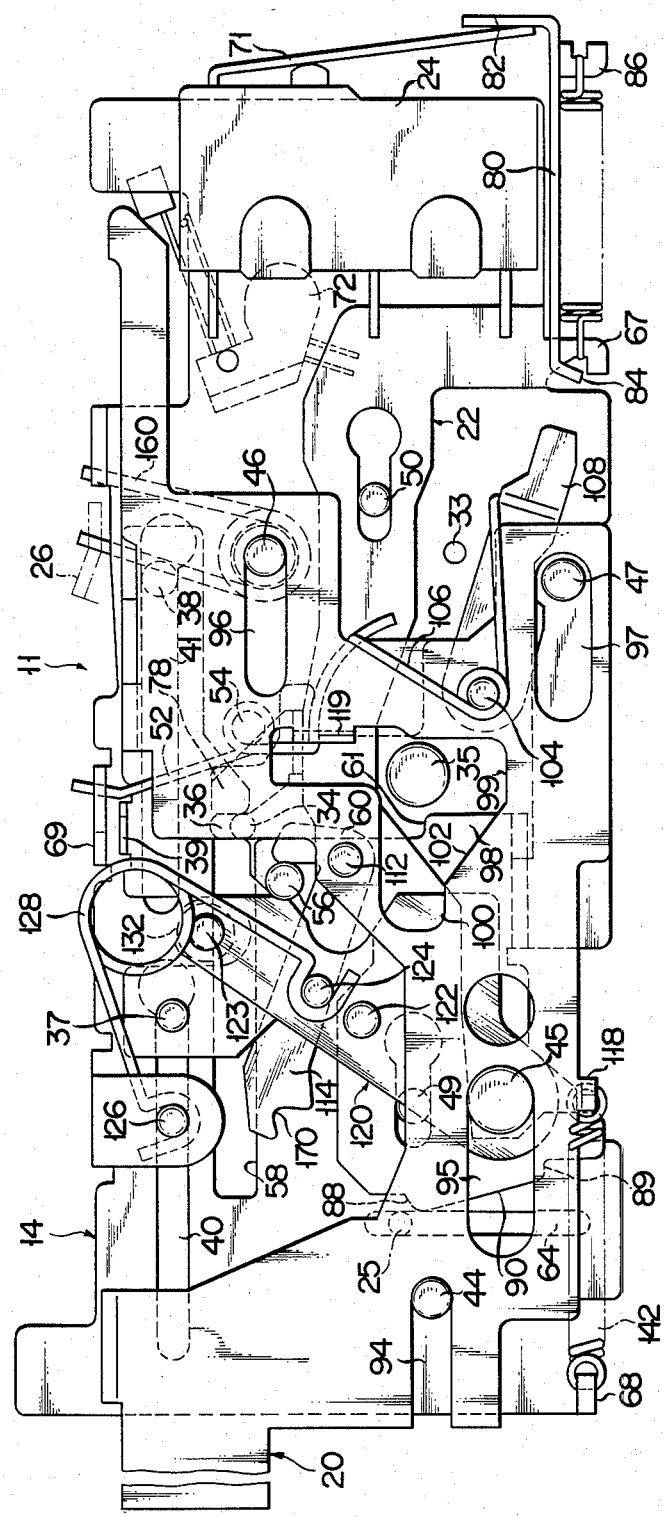

In the cassette tape recorder 10 shown in FIG. 2, a cassette 150 is inserted into the holder body 28 in the direction indicated by an arrow of FIG. 4, and is pushed in without resistance to the position represented by one-dot chain line where the forward end of the cassette 150 is caught by a holding strip 152 of the slider 27. Thereafter, if the cassette 150 is further pushed in, the slider 27, along with the control strip 30, slides to the right inside the holder body 28 against the urging force of the toggle spring 128 acting on the control strip 30 through the coupling plate 120, with the guide pin 34 engaging the guide slot 36. As the slider 27 and the control strip 30 move to the right, the coupling plate 120 rocks clockwise around the guide pin 45. Thereupon, the toggle spring 128 acts so as to prevent the coupling plate 128 from rocking clockwise. When the pin 124 passes a neutral line 156 of the toggle spring 128, however, the toggle spring 128 acts so as to rock the coupling plate 120 clockwise in a moment. Accordingly, the slider 27 and the cassette 150 are then sucked into the holder body 28 automatically and instantaneously by the urging force of the toggle spring 128, and the guide pin 34 runs against the right end of its corresponding guide slot 29 of the holder body 28. The guide pin 34 is always supported by the slide guide surface of the guide slot 62 while it moves from the left end to the right end of the guide slot 29. Preferably, the suction stroke in which the urging force of the toggle spring 128 acts so as to rock the coupling plate 120 clockwise is less than half, e.g., approxmately 20 to 30% of, the slide stroke of the slider 27. When the slider 27 and the control strip 30 slide to the right, the guide pin 34 runs against the bent strip 78 of the lock plate 22 to cause the lock plate 22 to slide to the right against the urging force of the tension spring 144 (see FIG. 10). When the lock plate 22 slides to the right, the holding cam 88 of the lock plate 22 is separated from the guide pin 25 of the holder body 28 to allow the guide pin 25 to move along the guide slot 64. The holder support 26 is urged by a torsion spring 160 wound around the guide pin 46 and the tension spring 140 shown in FIG. 2 to rock counterclockwise around the rocking pin 33, that is, to lower the cassette holder 18 (see FIG. 2). When the holding cam 88 leaves the guide pin 25, therefore, the holder support 26 is rocked counterclockwise around the rocking pin 33 by the urging forces of the torsion spring 160 and the tension spring 140, so that the holder body 28 is automatically instantaneously moved from its up position to the down position.

As the cassette holder 18 descends, the guide pin 25 disengaged from the holding cam 88 moves guided by the guide surface 90 of the lock plate 22 and the guide slot 64. At the same time, the guide pin 34 descends along the guide surface 60 of the guide slot 62 until it runs against a shoulder portion 61. Urged to the left by the tension spring 144, thereupon, the lock plate 22 moves to the left to hold the guide pin 25 in the holding cam 89 as the guide pin 25 descends. When the guide pin 25 is held in the holding cam 89, the cassette holder 18 is locked to its down position. As the lock plate 22 moves to the left, moreover, the upward bent portion 82 at the right end of the bent strip 80 moves with the operating strip 71 to turn on the main switch 24. When the guide pin 25 is held by the holding cam 89 to cause the cassette holder 18 to reach the down position, the head lever and the pinch roller lever automatically move toward the inner part of the cassette 150. Then, the head on the head lever and the pinch roller on the pinch roller lever come into contact with the tape to start the playback operation automatically (see FIG. 11).

Figure 11:
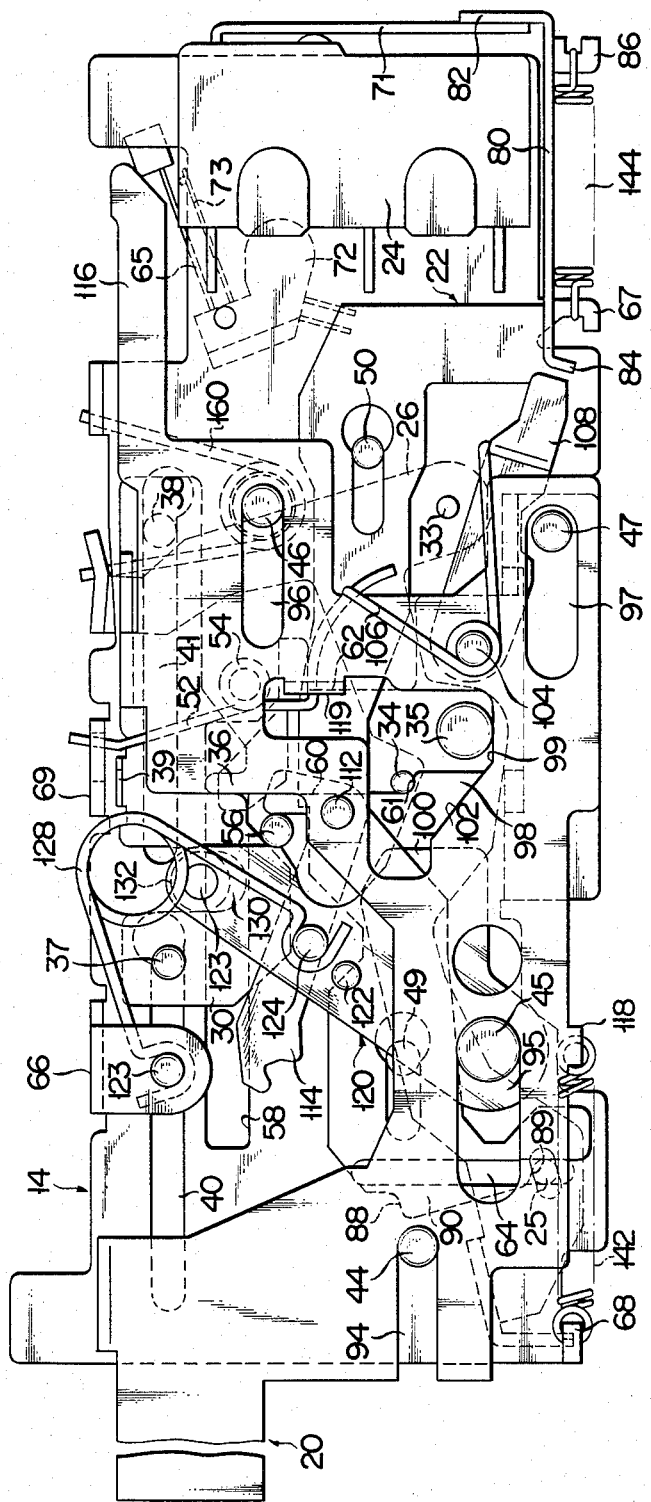

In FIG. 11 showing a playback mode, the cassette is ejected by pushing in the ejecting plate 20 from its first position as shown, that is, by moving the ejecting plate 20 to the right from the first position. The microswitch 72 is shifted when the shift lever 116 of the ejecting plate 20 deforms a movable contact 65 of the microswitch 12 to bring it into touch with a fixed contact 73 immediately after the movement of the ejecting plate 20. When the microswitch 72 is shifted, the solenoid mechanism 15 (see FIG. 1) is actuated to drive the head lever and the pinch roller lever out of the cassette, thereby separating the head and the pinch roller from the tape. Thus, a stand-by mode for cassette ejection is established. The movement of the ejecting plate 20 before the shift of the microswitch 72 can fully be achieved even under a low pressure since the ejecting plate 20 is subjected only to the urging force of the tension spring 142. In the subsequent movement, the ejecting plate 20 is subjected to a great resisting force because the lower portion of the torsion spring 52 held by the spring peg strip 119 of the ejecting plate 20 is deformed to apply an urging force to the ejecting plate 20. If the ejecting plate 20 is further pushed in, the swinging strip 108 of the ejecting plate 20 runs against the downward bent portion 84 of the bent strip 80 to move the lock plate 22, along with the swinging strip, to the right. When the lock plate 22 moves to the right, the holding cam 89 is disengaged from the guide pin 25. As the lock plate 22 moves to the right, moreover, the free end of the operating strip 71 of the main switch 24, following the motion of the upward bent portion 82 of the bent strip 80, moves to the right to turn off the main switch 24. The movement stroke of the ejecting plate 20 is made longer than that of the lock plate 22. When the lock plate 22 reaches its motion limit, the swinging strip 108 rocks counterclockwise around the pin 104 against the urging force of the torsion spring 106. Then, the swinging strip 108 moves on and along the bent strip 80. As the ejecting plate 20 is moved to the right, moreover, the rear end portion 115 of the swinging strip 114 leaves the kick pin 56, thereby allowing the swinging strip 114 to rock counterclockwise. Thus, when the ejecting plate 20 moves to the right, the swinging strip 114 rocks counterclockwie around the pin 112 to allow the holding cam 170 to engage the pin 122 of the coupling plate 120. On the other hand, the lower portion of the torsion spring 52, received by the spring peg strip 119, is deformed, while the upper portion rocks counterclockwise around the pin 54 and engages the bent strip 39 of the control strip 30 to press the control strip 30 to the left, and then engages the bent strip 69 of the guide plate 14 (see FIG. 12). Accordingly, the ejecting plate 20 is urged toward its first position by the torsion spring 52, so that the movement of the ejecting plate 20 after the shift of the microswitch 72 is subjected to a great resisting force.

There will now be explained the relationship between the ejecting plate 20 and the cassette holder 18. The holder support 28 rises as the ejecting plate 20 is moved to the right. Namely, if the ejecting plate 20 is pushed in, the guide roller 35 of the holder support 26 is pushed upward by the slant guide surface 102. Then, the holer support 26 rocks in the clockwise direction of FIG. 11 around the rocking pins 33 and 138 against the urging forces of the torsion spring 160 and the tension spring 140. Thus, the guide pin 25 disengaged from the holding cam 89 moves up in the guide slot 64 to allow the holder body 28 to rise. As the holder body 28 rises, the slider 27 also rises, so that the guide pin 34 moves along the up-and-down guide surface 60. After reaching the top end of the up-and-down guide surface 60, the guide pin 34 is received in the guide slot 36 of the control strip 30. Thereafter, the control strip 30 is temporarily pushed to the left by the torsion spring 52, and slides to the left until the upper end portion of the torsion spring 52 runs against the bent strip 69 of the guide plate 14. As the control strip 30 slides in this manner, the guide pin 34, along with the slider 27, slides to the left to be supported on the slide guide surface 58. As the swinging strip 108 rocks counterclockwise, moreover, the lock plate 22 is allowed to move to the left. Thus, the lock plate 22 is moved to the left by the urging force of the torsion spring 144, and the holding cam 88 engages the guide pin 25 to lock the cassette holder 18 to its up position. FIG. 12 shows such a state that the ejecting plate 20 is pushed into its motion limit or second position. In this state, the tension spring 142 and the torsion spring 52 are fully stretched and deformed, respectively, so that good urging forces are stored in these springs.

If the pressing force having so far been applied to the ejecting plate 20 is removed after the ejecting plate 20 is pushed into its second position, the ejecting plate 20 is moved from the second position to its first position by the urging forces of the tension spring 142 and the torsion spring 52. When the ejecting plate 20 moves toward the first position or to the left, the holding cam 170 of the swinging strip 114 is arrested by the pin 122 of the coupling plate 120. Then, the swinging strip 114 causes the coupling plate 120 to rock counterclockwie around the guide pin 45 against the urging force of the toggle spring 128, accompanying the movement of the ejecting plate 20. When the coupling plate 120 rocks counterclockwise, the control strip 30 coupled therewith by means of the pin 123 slides to the left. As the guide pin 34, along with the control strip 30, then slides to the left, the slider 27 also slides to the left in the holder body 28. If the coupling plate 120 is rocked counterclockwise until the pin 124 of the coupling plate 120 passes the neutral line 156 of the toggle spring 128, then the toggle spring 128 will produce an urging force to rock the coupling plate 120 instantaneously counterclockwise. After the pin 124 passes the neutral line 156, the rear end portion 115 of the swinging strip 114 runs against the kick pin 56 of the guide plate 14. Accordingly, the swinging strip 114 is kicked clockwise around the pin 112, so that the holding cam 170 is disengaged from the pin 122. As a result, the coupling plate 120 is rocked counterclockwise by the urging force of the toggle spring 128, and the control strip 30 and the slider 27 slide to the left. The control strip 30 and the slider 27 slide to the left until the pins 37 and 38 of the control strip 30 run against the left ends of the guide slots 40 and 41, respectively, and thus the cassette 150 in the cassette holder 18 is ejected. Hereupon, the pin 122 of the coupling plate 120 is disengaged from the holding cam 170 of the swinging strip 114 after the pin 124 passes the neutral line 156 of the toggle spring 128. Accordingly, even though the pin 124 passes the neutral line 156, the coupling plate 120 will never drastically be rocked by the urging force of the toggle spring 128. Thus, the cassette 150 is prevented from rushing out of the cassette holder 18. The time to disengage the pin 122 of the coupling plate 120 from the holding cam 170 of the swinging strip 144 can readily be adjusted by changing the position where the rear end portion 115 of the swinging strip 114 engages the kick pin 56 of the guide plate 14, that is, by shifting the position of the kick pin 56 horizontally.

In the above embodiment, the holding cam 170 of the swinging strip 114 to engage the pin 122 of the coupling plate 120 is formed at the extended end of the front end portion 117. The holding cam 170 need, however, only be formed at the front end portion 117 between the extended end thereof and the pin 112. In the foregoing embodiment, moreover, the pin 122 and the holding cam 170 serve as the engaging portion of the coupling plate 120 and the holding portion of the swinging strip 114, respectively. The same effect may also be obtained with use of a holding cam and a pin for the engaging portion of the coupling plate 120 and the holding portion of the swinging strip 114, respectively.

What is claimed is:

1. A cassette ejection mechanism of a cassette tape recorder comprising a pair of guide plates facing each other, a cassette holder disposed between the guide plates to be movable between an up position and a down position and containing a tape cassette therein, and slide means disposed to be slidable substantially horizontally along the cassette holder and being slidable together with the tape cassette in the cassette holder, wherein the tape cassette inserted in the cassette holder, along with the cassette holder, is moved to its down position after the tape cassette slides in the cassette holder, and further comprising:
    an ejecting plate attached to one of the guide plates to be movable between a first position and a second position, whereby the cassette holder is pushed up from the down position to the up position thereof as the ejecting plate moves from the first position to the second position, and the tape cassette in the cassette holder slides to be ejected as the ejecting plate moves from the second position to the first position;
    a coupling plate rockably attached to said one guide plate, said coupling plate engaging the slide means, said coupling plate having an engaging portion, and said coupling plate being rockable in response to the slide motion of the slide means;
    a toggle spring having one end attached to said one guide plate and having another end attached to the coupling plate to apply an urging force to the coupling plate in rocking motion; and
    a swinging strip swingably attached to the ejecting plate, the swinging strip having a holding portion to engage the engaging portion of the coupling plate to cause the coupling plate to rock against the urging force of the toggle spring as the ejecting plate moves from the second position to the first position and to be disengaged from the engaging portion after the toggle spring passes its neutral point.

2. The cassette ejection mechanism according to claim 1, which further comprises a kick pin on the guide plate, and wherein the swinging strip includes a front end portion having the holding portion formed thereon and a rear end portion capable of engaging the kick pin, so that the rear end portion runs against the kick pin to be rocked to disengage the holding portion from the engaging portion of the coupling plate after the toggle spring passes its neutral point as the ejecting plate moves from the second position to the first position.

3. The cassette ejection mechanism according to claim 2, wherein said engaging portion has a pin attached to the coupling plate, and said holding portion has a holding cam formed at the front end portion of the swinging strip.

4. The cassette ejection mechanism according to claim 1, wherein said ejecting plate is provided with a guide hole having a slant guide surface, and the cassette holder includes a holder support rockably attached to the guide plate, a holder body supported by the holder support and containing the tape cassette therein, the holder body moving between the up and down positions as the holder support rocks, and a guide roller rotatably attached to the holder support and projecting into the guide hole of the ejecting plate, so that the slant guide surface of the ejecting plate causes the holder support to rock by means of the guide roller, thereby moving the holder body from the down position to the up position thereof, as the ejecting plate moves from the first position to the second position.

5. The cassette ejecting mechanism according to claim 4, wherein said slide means includes a slider slidably disposed in the holder body and a control strip slidably attached to the guide plate and sliding together with the slider, the coupling plate engaging the control strip.

* * * * *